United States Patent [19]
Veldkamp

[11] 4,300,417
[45] Nov. 17, 1981

[54] METHOD AND DEVICE FOR MACHINING GLASS AND VITREOUS MATERIAL AS WELL AS WORK-PIECE OF GLASS OR VITREOUS MATERIAL MACHINED ACCORDING TO THE METHOD

[75] Inventor: Johannes C. G. Teunissen; Rudolf Brehm; Jan Haisma; Jan D. B. Veldkamp, all of Eindhoven, Netherlands

[73] Assignee: U.S. Philips Corporation, New York, N.Y.

[21] Appl. No.: 102,716

[22] Filed: Dec. 12, 1979

[30] Foreign Application Priority Data

Dec. 18, 1978 [NL] Netherlands ......................... 7812246

[51] Int. Cl.³ .............................................. B23B 1/00
[52] U.S. Cl. ................................. 82/1 C; 82/DIG. 1; 51/322; 65/105; 83/170
[58] Field of Search ................... 82/1 C, DIG. 1, 2 R; 125/1, 10; 51/322, 283; 65/105, 109, 113; 83/16, 170

[56] References Cited
U.S. PATENT DOCUMENTS

2,600,453  6/1952  Weingart ............................... 82/1 C
3,810,748  5/1974  Matuzawa et al. .................... 65/109
4,098,153  7/1978  Clark et al. .......................... 82/1 C Primary Examiner—Leonidas Vlachos
Attorney, Agent, or Firm—Thomas A. Briody; Robert T. Mayer; Paul R. Miller

[57] ABSTRACT

A method and device are provided for machining transparent glass and vitreous material by means of a single point cutting tool. A portion of the workpiece to be worked is heated integrally and uniformly by a first heat supply, which is spread along the workpiece, to the softening temperature, and simultaneously the surface to be worked is locally heated in the region of the cutting area at the moment of material removal to a depth equal to the cutting depth by a second concentrated heat supply which is superimposed on the first heat supply. All this is provided in such a manner that a turning operation, as well as simultaneously therewith and immediately thereafter a relaxed flow of the work surface, takes place. By means of the method according to the invention, it is possible to turn workpieces of glass and vitreous materials so that the work surface has a high dimensional accuracy, as well as an optical surface quality in particular, such as a smooth and transparent surface.

12 Claims, 7 Drawing Figures

METHOD AND DEVICE FOR MACHINING GLASS AND VITREOUS MATERIAL AS WELL AS WORK-PIECE OF GLASS OR VITREOUS MATERIAL MACHINED ACCORDING TO THE METHOD

The invention relates to a method of machining glass and vitreous materials, wherein a work-piece of glass or vitreous material to be worked and a turning or cutting tool are moved relative to one another, the turning tool is brought into contact with the surface of the work-piece and the work-piece is subjected at its surface to a turning operation.

In such a generally known method a glass work-piece is subjected to a grinding operation wherein the material to be removed is removed abrasively by abrasive grains which are either bound or not bound. A comparatively high dimensional accuracy can be obtained with this known method; however, as the material to be removed is pulverized, the machined surface is mat, that is to say it is not optically transparent.

In the past turning of glass at room temperature by means of a diamond tool was investigated by inter alia Dr. D. M. Busch at the Technical University of Hannover (German Federal Republic). He has found that in the above-mentioned circumstances a continuous glass chip can be obtained only, and absolutely only, when the chip thickness, that is to say the infeed of the tool is small, in the order of only a few microns. A typical example mentioned by Dr. Busch is a glass chip which is 8 mm long, 7 $\mu$m wide and of a thickness of 3 $\mu$m at a maximum. The treated surface remains mat, that is to say the surface condition does not become optically transparent in this turning operation.

It is an object of the invention to provide a method by means of which it is possible to treat a work-piece of glass or of vitreous material so that the treated surface has a great dimensional accuracy as well as an optical surface quality, the material removed per cut being in the order of 20 $\mu$m thick, 100 $\mu$m wide and many centimeters long. An optical surface quality is understood to mean a surface which is smooth and transparent.

A surface is said to be transparent when the surface protrusions on that surface do not exceed a value of 0.02 $\mu$m, that is to say they are very small with respect to the wavelength $\lambda$ of the visible light covering the wavelength range from $0.4<\lambda<0.7$ ($\mu$m) and wherein the dimensions in the plane may be large to very large with respect to the wavelength of the visible light.

According to the invention this object is mainly accomplished in that a portion of the work-piece to be worked is heated to such an extent that a viscosity substantially corresponding to the softening temperature is obtained at the surface, subsequently turning the softened surface by means of a single-point turning tool, whereafter the work-piece is cooled to ambient temperature.

Investigations have shown that in the method according to the invention, in contrast with the known method, the material removed is not pulverised but that the turning tool removes the material in the form of an uninterrupted, relatively thick chip, wherein shearing phenomena are observable, this chip having a great length in the order of meters and a thickness in the order of 20 $\mu$m, and to a certain extent comparable to the chip formation occurring in precision turning for optical purposes of metal, for example copper and aluminium. Of course the work-piece is heated to the softening temperature to a depth only which is approximately equal to the desired chip thickness or slightly thereabove; the core of the work-piece remains at a lower temperature with such a corresponding viscosity that sufficient resistance is offered to a bending moment and the torque occurring during the operation. Apparently, optical surface quality is the result of the abrasive operation in combination with local viscous deformation, the latter resulting from local viscous relaxation of the glass during and immediate subsequent to the removal of the chip.

The softening temperature is defined as the temperature at which the material has a viscosity of approximately $10^{6.6}$ Pa.s. The temperature range in which a glass or a vitreous material permits turning with the method according to the invention can be rather accurately defined. Continuous chip formation does not occur when the temperature in the region of the cut is too low; the abrased material crumbles during the operation, fragments of the material splinter off from the work-piece and the surface quality is highly uneven, rough and optically mat. At too high a temperature in the region of the cut melting phenomina causes bulges, smears and deformations at the surface of the work-piece and excludes a precision operation. The temperature range between a surface which is distinctly too cold and distinctly too warm covers an overall range of approximately 50° C. for practically suitable materials. The temperature range suitable for the method according to the invention covers a temperature region of 30° C. situated in the center of the overall range; normally the softening temperature is located in that region.

The method according to the invention is particularly suitable for machining long glasses, that is to say glasses having a relatively small viscosity variation over a comparatively long temperature range.

In a preferred embodiment of the method according to the invention the portion to be worked of the work-piece is subjected prior to cooling to a multiple heat treatment which is adapted to the working operation. This enables heating and cooling diverse glasses and vitreous materials in a manner which is best suited to the working of the material.

A further preferred embodiment of the method according to the invention is characterized in that the portion to be worked of the work-piece is heated by a first spread heat supply and brought, substantially integrally and uniformly to substantially softening temperature and in that simultaneously the surface to be worked is locally heated by a second concentrated heat supply, superimposed on the first heat supply, at the level of the cutting area and to a depth at least equal to the required cutting depth, all this in a way that the overall energy supply effects continuous chip formation as well as simultaneously and immediately subsequent thereto a viscous relaxation of the worked surface.

Thanks to the characteristic measures the work-piece is thermally processed so that on the one hand the surface can be chipped, the grooves formed by the turning tool being smoothed out simultaneously as well as immediately subsequent thereto by viscous flow of the material, whereas on the other hand heating of the core is limited, so that bending moments and torques occurring during the operation are compensated for by the core.

Disturbances in the chip formation and irregularities of the worked surface of the work-piece are prevented in a further embodiment of the method according to the invention according to which the turning tool is heated in such manner that no heat transport of any importance from the work-piece to the tool takes place. Heating the turning tool in this manner prevents a disturbance of the uniform temperature distribution on the surface of the work-piece as well as the formation of a cold spot in situ of the cut. This measure is particularly suitable when a turning tool having a relatively high coefficient of heat conductivity, such as diamond, is used.

A further embodiment of the method according to the invention is characterized in that, prior to cooling the work-piece to ambient temperature, heating of the work-piece is continued at a reduced rate to control the cooling of the work-piece to approximately the annealing temperature of the material so that the work-piece is stress-free after complete cooling. Annealing the work-piece in this manner has a positive effect on the dimensional accuracy. Annealing of the work-piece depends on the material to be worked. Annealing is, for example, not required when working a work-piece of quartz glass.

A work-piece of glass or vitreous material worked by means of the method according to the invention is characterized by a high dimensional accuracy of some μm, the overall precision depending of course on the size of the work-piece, and by an optical surface quality, that is to say by a smooth and transparent surface. Glass work-pieces of varying dimensions and shapes, rod-shaped, tubular or spherical, can be worked with the method according to the invention; however, in view of the obtainable optical surface quality the method is particularly suitable for producing optical elements, for example aspherical lenses of glass and associated vitreous materials, glass ceramics and glass synthetic materials.

The invention also relates to a device for performing the method; according to the invention this device is characterized by a rotatable work-piece holder, a tool holder having a chisel-type cutting tool and being adjustable with respect to the work-piece holder and a heating element which is adjusted with respect to the work-piece holder, the work-piece holder, the heating element and the tool holder being movable with respect to one another. To perform the method a comparatively simple, but highly stable precision device is sufficient. The work-piece is clamped in the work-piece holder, heated to the desired temperature by means of the heating element and worked by means of the cutting tool, the work-piece holder with the work-piece being rotated.

A preferred embodiment of the device is characterized by a second heating element with a concentrated heat output, the first heating element being of the type having a spread heat output. By means of the first heating element the work-piece is heated uniformly over the overall length to be worked and the worked surface is further heated by means of the second heating element simultaneously with the working operation and at the level of the cutting area, so that the irregularities resulting during the operation are immediately smoothed out by viscous deformation.

With a further preferred embodiment of the device according to the invention, the second heating element is of the instantaneously controllable type and is included in a control circuit. Usually, the first heating element is of an adjustable but not instantaneously controllable type. By means of the second instantaneously controllable heating element the temperature of the surface to be worked can be brought immediately and without delay to the required value at the moment of stock removal and in situ of the cutting area.

With a further preferred embodiment of the device according to the invention the control circuit comprises a radiation temperature measuring element. Thanks to this measure the temperature of the work-piece in situ of the cutting area can be adjusted to an accuracy of $\pm 2°$ C. by adjusting the second heating element. The output signal of the temperature measuring element is fed back to a control, which adjusts the second heating element substantially without any delay by means of a control signal.

The heating elements may be of diverse embodiments, such as radiating, conducting and convective elements, for example radiation resistance or inductive heating elements, as long as the power is sufficient to heat the work-piece to the required temperature. However, with another preferred embodiment of the device according to the invention the heating elements are in the form of gas burners, one burner being of the slit burner type and the other of the spot burner type. Gas burners have the advantage that the work-piece can be heated quickly, locally and in a controllable manner, it being possible to direct the burner flame rather accurately to the work-piece, before, respectively behind, the cutting tool.

A last preferred embodiment of the device according to the invention is characterized in that the cutting tool is made from a wear-resistant temperature-resistant and form-retaining material, which is adapted to the material to be shipped. It will, for example, not be possible to use diamond as the cutting tool material for every material suitable for chipping, the reason being that above a temperature of approximately 500° C. the diamond will change from the crystalline phase to the graphite phase, the so-called graphitisation of diamond; and at a temperature of approximately 800° C. the diamond will even be burned. This situation is impermissible for precision working. Other known chisel materials such as borazon and hafnium-nitride are much more suitable than diamond. Generally speaking the cutting tool must be of a sufficient hardness and wear-resistance at the operating temperature during the cutting process; also the heat-conduction and friction resistance must be sufficiently adapted to the material to be worked. Diamond has, for example, a high heat conductivity which has a negative effect on precision working.

The invention will be further explained with reference to the drawing. In the drawing.

Figure 1:
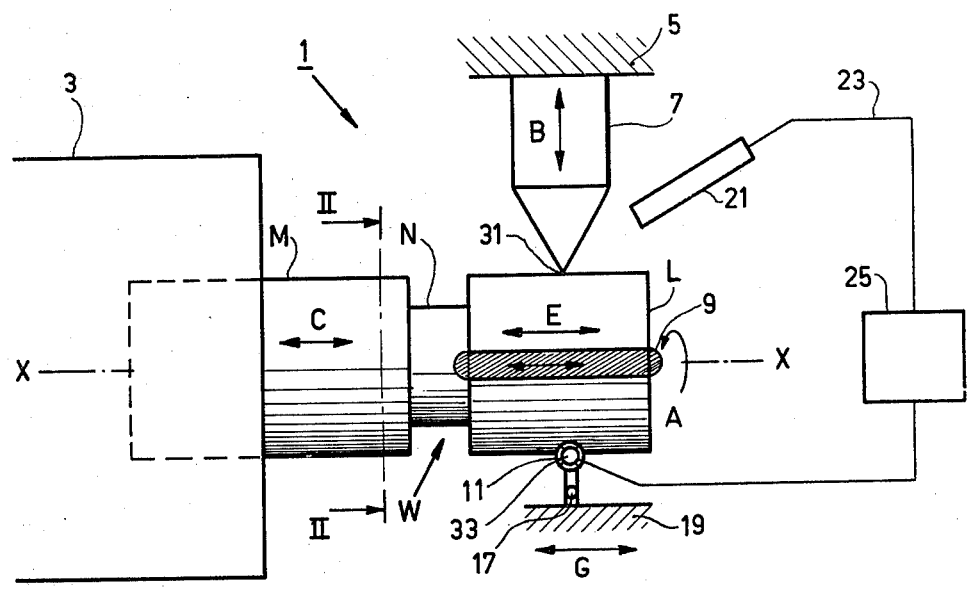
FIG. 1 shows a schematic side elevational view of the device according to the invention.
Figure 2:
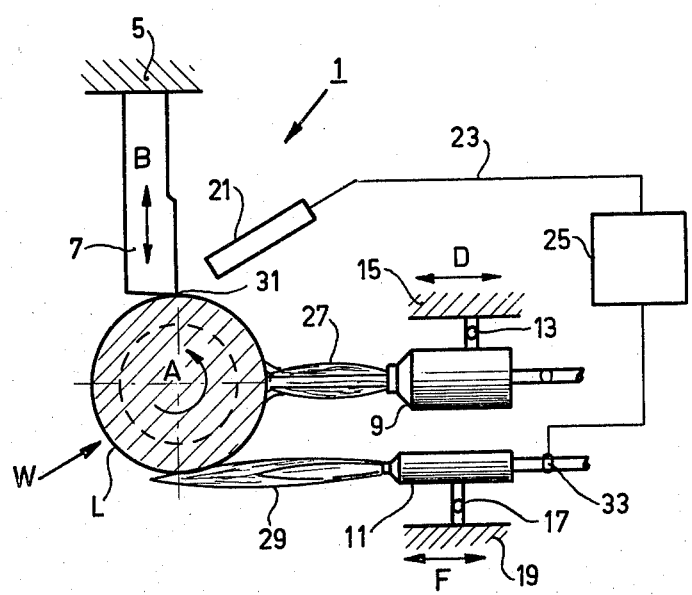
FIG. 2 shows a cross-sectional view of the device along line II—II in FIG. 1.

The device 1 shown schematically in the FIGS. 1 and 2 mainly comprises a work-piece holder 3, a tool holder 5 with a cutting tool 7 and two gas burners, namely an adjustable slit burner 9 and a spot burner 11, which is both adjustable and controllable instantaneously. Line X—X denotes the axis of the work-piece holder 3.

The work-piece holder 3 can be made to rotate in the direction shown by arrow A by a drive, not further shown. Arrow B shows the radial direction in which the tool holder 5 with cutting tool 7 is adjustable with respect to the center line X—X of the work-piece holder. The work-piece holder and the tool holder can be relatively moved with respect to one another into a direction parallel to the center line X—X of the work-piece holder. In the shown embodiment the work-piece holder 3 is movable into the direction shown by arrow C.

The slit burner 9 is secured to a holder 15 by means of a ball-and-socket joint 13, the holder being adjustable into the radial direction shown by arrow D and into the axial direction shown by arrow E. The spot burner 11 is mounted on a slide 19 by means of a ball-and-socket joint 17, the slide being adjustable into the radial and the axial direction, respectively, with respect to the work-piece holder as shown by the arrows F and G, respectively. Reference numeral 21 denotes an infrared radiation temperature measuring element which is included, together with the spot burner 11 in a control circuit 23 comprising a control 25.

W denotes a cylindrical work-piece, having a cylindrical portion L to be worked and a portion M, by means of which the work-piece is clamped in the work-piece holder, the portions being separated by means of a constricted portion N.

For the turning of the portion L, which may have been pretreated, for instance by a grinding-operation, the work-piece is clamped by means of clamping portion M in the work-piece holder 3, the axis of the work-piece coinciding with the axis X—X of the work-piece holder. Thereafter, the work-piece holder is rotated into the direction shown by arrow A and the slit burner 9 is positioned so that the wide burner flame 27 is directed radially to and over the overall length of the portion L to be worked of the work-piece. The gas supply is preset in such a manner that the work-piece portion L, considered from the axial direction is uniformly and integrally heated and a viscosity corresponding with the softening temperature is obtained at the surface. The spot burner 11 is positioned so that the pointed burner flame 29 is directed tangentially to the portion L to be worked, at the level of the chisel point 31, which also determines the cutting point. Thereafter the tool holder 5 is adjusted in the radial direction and the work-piece holder is moved in the axial direction with a predetermined rate so that the cutting tool removes a continuous chip of the desired thickness and of a relatively great length in the order of a few centimeters. Superimposed in the spread heat supply from the slit burner 9 the portion L is locally heated by the spot burner in the region of the chisel point 31 so that a turning operation as well as a viscous relaxation of the worked surface takes place. The temperature of the work-piece in situ of the cutting area 31 is supervised by the temperature measuring element 21. For deviations exceeding 3° C. from a preset temperature the temperature element 21 applies an output signal, via the control circuit 23, to the control 25 which operates a gas valve 33 by means of a control signal and readjusts the gas flow to the spot burner 11.

After the portion L has been fully worked the work-piece can be uniformly further heated, if the worked material makes this desirable or necessary, prior to cooling to ambient temperature, by means of the slit burner 9 to control the cooling of the work-piece down to the annealing temperature of the material so that after complete cooling the work-piece is stress free.

After having been fully worked and after complete cooling, the portion L is separated from the clamping portion M in the region of the constriction N.

Figure 4:
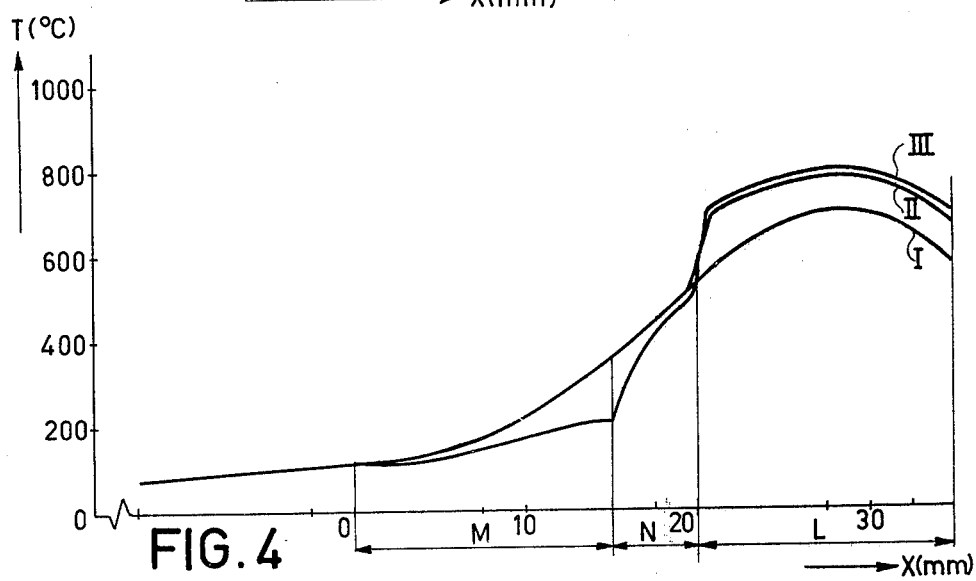

FIG. 4 shows the temperature distribution in a work-piece W measured during the working of a work-piece by means of the method and the device according to the invention.

The work-piece consists of an optical glass having a softening point of 800° C., and an annealing temperature of 529° C. with the following composition in a percentge by weight: SiO$_2$ 56.2; Na$_2$O 1.5; K$_2$O 11; BaO 15; ZnO 9; and PbO 7. The cutting speed was 1.25 m/sec., the tool speed was 10 mm/min. and the infeed 10 μm.

Figure 3:
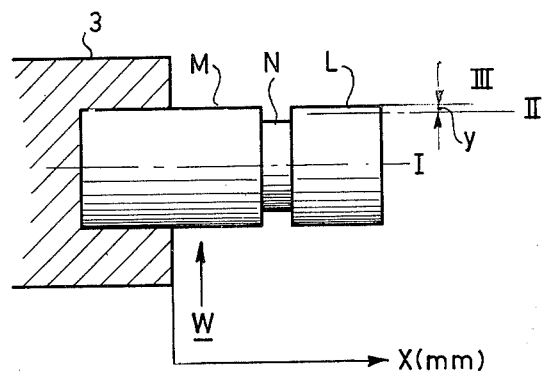
FIGS. 3 and 4 show the temperature variation in the work-piece.

FIG. 3 shows the measuring levels considered in the radial direction: level I coincides with the axis X—X of the work-piece W; level III coincides with the surface of the work-piece; and level II is located at a depth y of 0.5 mm. The distance in mm from the work-piece holder 3 is defined by X.

As FIG. 4 shows the temperature of the portion L to be worked of the work-piece is approximately 100° C. lower in the axis of the work-piece than the softening point of substantially 800° C. at the surface of the work-piece; and at a depth of 0.5 mm the temperature is only 20° C. below the softening point. Surprisingly good results were obtained with the above-mentioned glass, namely a high-dimensional accuracy as well as a transparent optical surface quality.

Figure 7:
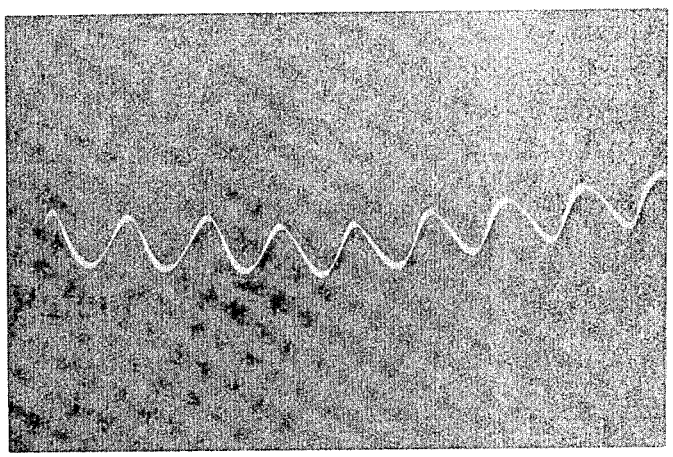
FIGS. 5, 6 and 7 show photographs of a processed surface area as well as of a chip.
Figure 5:
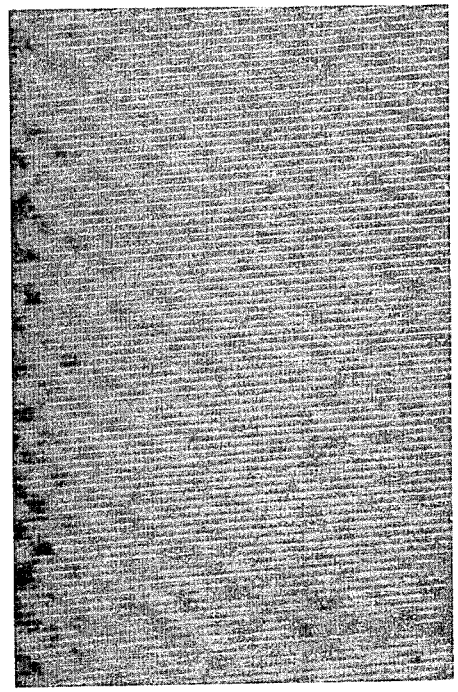
Figure 6:
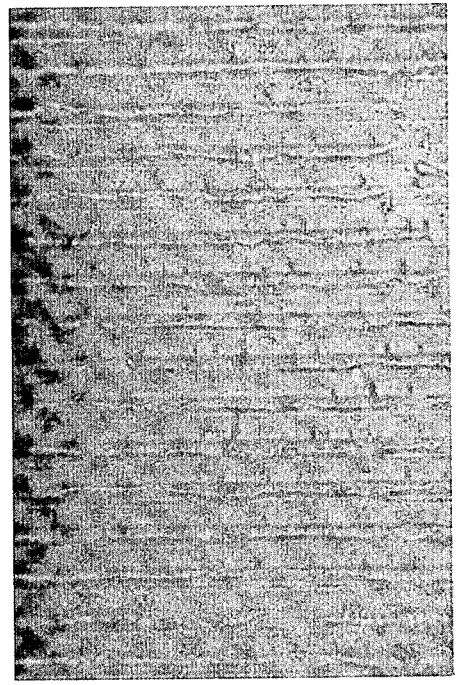

The FIGS. 5 and 6 show photographically the surface which was processed as described above, enlarged 100 and 500 times, respectively. FIG. 7 shows the removed glass chip twice enlarged.

The glass of the following Table, which all belong to the class of optical glasses, furnished the same good results as the above-mentioned glass:

TABLE

| Composition | Glasses | | | |
| --- | --- | --- | --- | --- |
| (wt. %) | I | II | III | IV |
| As$_2$O$_3$ | 0.4 | 0.6 | 0.3 | 0.1 |
| B$_2$O$_3$ | 16.6 | 8.0 | 13.6 | 23 |
| BaO | — | — | 24.0 | 1 |
| K$_2$O | 11.2 | 9.8 | 7.6 | 8 |
| SrO | — | — | 0.3 | — |
| ZnO | 18.9 | 24.9 | 5.0 | — |
| Na$_2$O | — | — | — | 14 |
| ZrO | — | — | 0.1 | — |
| TiO$_2$ | 0.2 | — | — | — |
| CaO | — | — | — | 0.1 |
| SiO$_2$ | 52.7 | 52.7 | 56.7 | 49.1 | 55 |
| T$_A$ [°C.] | 790 | 780 | 780 | 760 |
| T$_o$ [°C.] | 562 | 534 | 580 | 559 |

T$_A$ indicates the softening temperature and T$_o$ the annealing temperature.

In the described embodiment the work-piece was moved into the axial direction with respect to the stationary cutting tool and the stationary burners. It will be clear that the Kinetically reverse situation, that is to say moving the cutting tool and the burner synchronous with the cutting tool relatively to the work-piece, is within the framework of the invention. Furthermore the work-piece can be treated in two phases, a relatively large infeed being applied in the first phase in the order of 20 μm or more.

What is claimed is:

1. A method for machining glass and vitreous material comprising:

moving a workpiece of glass or vitreous material relatively to a turning tool, said workpiece being subjected to surface cutting by said turning tool, heating a portion of said workpiece to achieve a viscosity substantially corresponding to the softening temperature at the surface of said workpiece, said step of heating including a step of longitudinally heating said workpiece to substantially the softening temperature by a first spread-out heat supply, and simultaneously locally heating the surface of said workpiece to be worked to a depth at least equal to the desired cutting depth by a second concentrated heat supply, subsequently turning the softened surface of said workpiece by a single point turning tool, and thereafter cooling said workpiece to ambient temperature.

2. A method according to claim 1, wherein, prior to said step of cooling said workpiece, said workpiece is subjected to a multiple heat treatment corresponding to the working operation.

3. A method according to claim 1 or 2, wherein said turning tool is heated to prevent heat transfer between said workpiece and said turning tool.

4. A method according to claim 1 or 2, wherein, prior to said step of cooling, said workpiece is continuously heated at a reduced rate to control cooling to the annealing temperature of said workpiece.

5. A method according to claim 1, wherein said two part heating step is carried out to effect continuous chip formation, and to simultaneously and immediately subsequent thereto achieve viscous relaxation of the worked surface.

6. A workpiece of glass or vitreous material formed by a method of moving the workpiece relatively to a turning tool for carrying out surface cutting, heating a portion of said workpiece in a two part technique by providing a spread heating supply and a spot heating supply on said portion, cutting a softened surface of said workpiece with a single point turning tool, and cooling the formed workpiece to an ambient temperature.

7. A device for machining glass or vitreous material comprising a rotatable workpiece holder, a tool holder providing a cutting tool which is adjustable with respect to said workpiece holder, means adjustable with respect to said workpiece holder for heating said workpiece by a first heating element providing a spread heat output and a second heating element providing a localized spot heat output, and means for moving said heating means relative to said workpiece holder and said tool holder.

8. A device according to claim 7, wherein said second spot heating element provides a concentrated heat output to a localized area of said workpiece.

9. A device according to claim 8, wherein said second heating element is instantaneously adjustable and is included in a control circuit.

10. A device according to claim 9, wherein said control circuit includes a radiation temperature measuring element.

11. A device according to claim 7, wherein said first and second heating elements are in the form of gas burners with said first heating element being a slit burner type and said second heating element being a spot burner type.

12. A device according to claim 7, wherein said cutting tool is made from a wear-resistant, temperature-resistant, and form-retaining material adapted to the material of said workpiece.

* * * * *